Feb. 12, 1963 H. J. PARSONS 3,077,353
COLLET ACTUATING MECHANISM
Filed Sept. 22, 1960 3 Sheets-Sheet 2

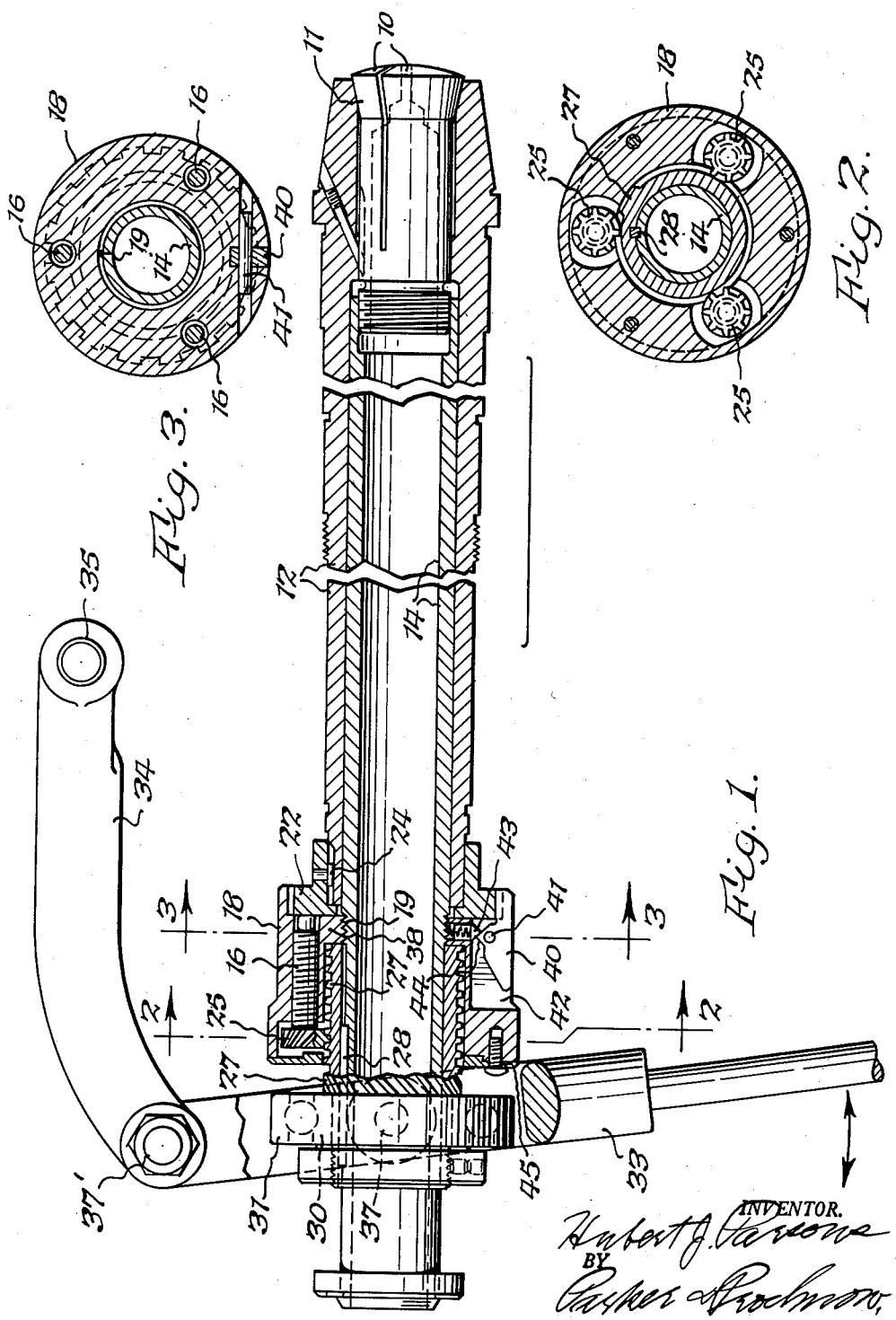

INVENTOR.
Hubert J. Parsons
BY
Parker Woodman,
ATTORNEYS.

Feb. 12, 1963   H. J. PARSONS   3,077,353
COLLET ACTUATING MECHANISM
Filed Sept. 22, 1960   3 Sheets-Sheet 3

INVENTOR.
Hubert J. Parsons,
BY
Parker & Frohman,
ATTORNEYS.

United States Patent Office 3,077,353
Patented Feb. 12, 1963

3,077,353
COLLET ACTUATING MECHANISM
Hubert J. Parsons, Horseheads, N.Y., assignor to Hardinge Brothers, Inc., Elmira, N.Y.
Filed Sept. 22, 1960, Ser. No. 57,694
8 Claims. (Cl. 279—51)

This invention relates to mechanisms for opening and closing collets or other chucking devices.

One of the problems with collet closers as heretofore manufactured has been the lack of ability to hold work pieces having a variation in diameter of over one or two thousandths of an inch. These prior art collet closers have one locked position of the collet which is satisfactory if the parts held by the collet are all of the same diameter, but if they differ even slightly in diameter considerable variation in chucking pressure results. These prior art collet closers were provided with adjustments whereby they can be adapted for operating on smaller or larger pieces but an adjustment must be made every time a work piece of different diameter is to be chucked, which is time consuming.

It is consequently one of the objects of this invention to provide a collet actuating device which overcomes these difficulties and which is operable on work pieces varying considerably in diameter. It is also an object to provide a collet actuating device of this type which locks the work pieces positively in any position in which it is gripped. Another object is to provide a collet actuating device of this type which may be moved into locking and unlocking position by means of air pressure and which remains in locking or gripping position without continued air pressure.

In the accompanying drawings:

FIG. 1 is an elevation partly in section of a collet actuating device embodying this invention.

FIGS. 2 and 3 are transverse sections thereof on lines 2—2 and 3—3, FIG. 1.

Figure 4:
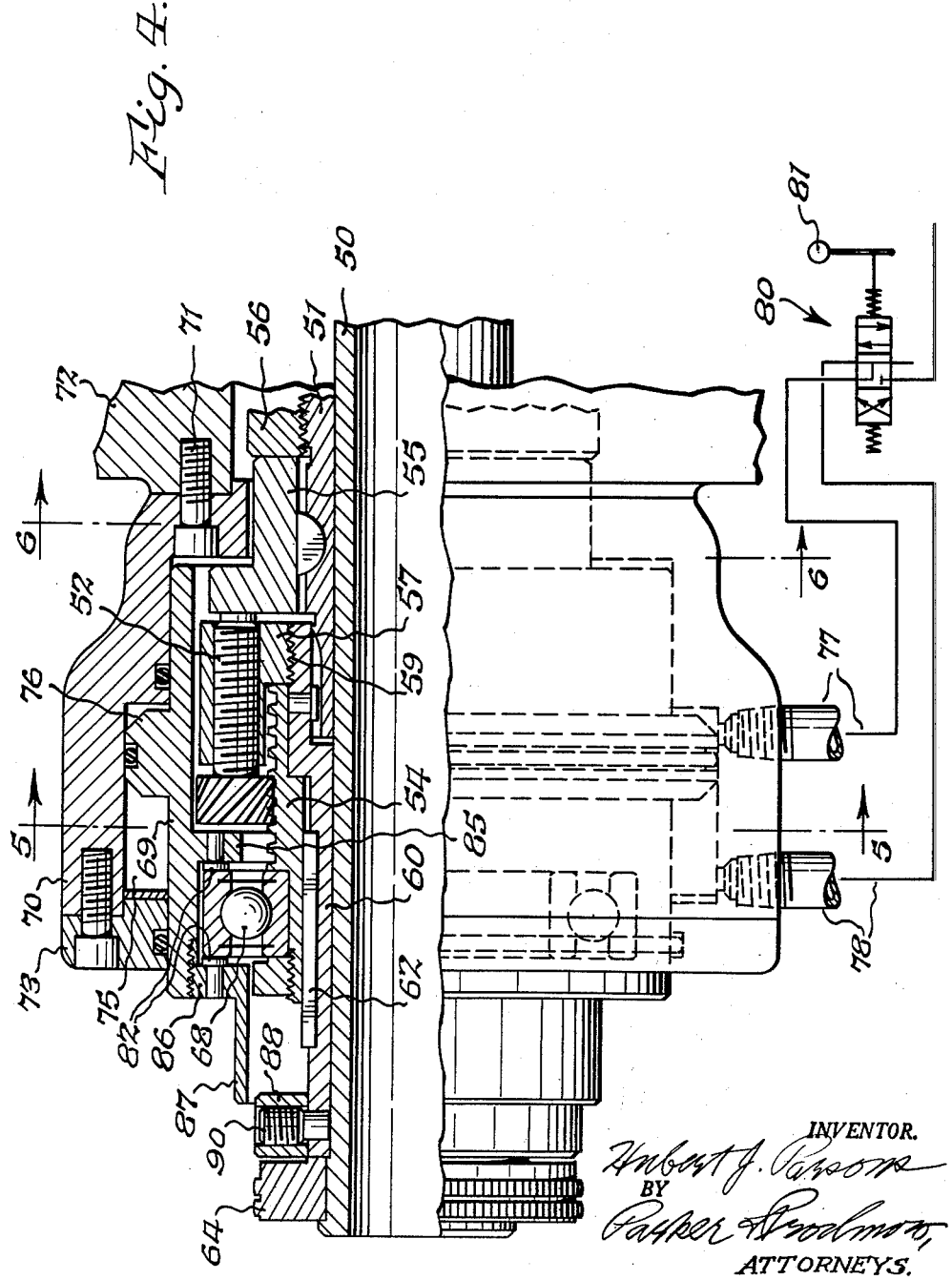

FIG. 4 is an elevation partly in section of a collet actuating device actuated by fluid pressure.

Figure 6:
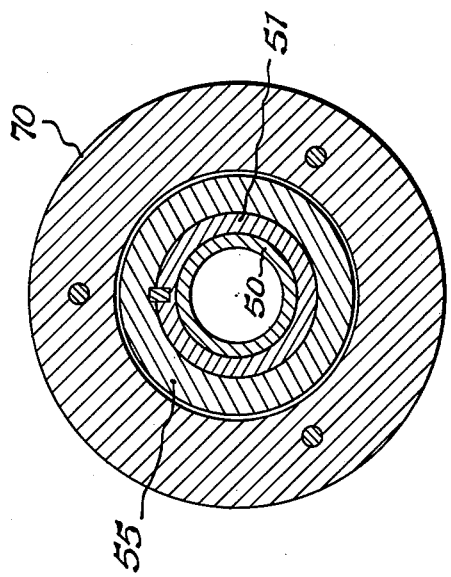
Figure 5:
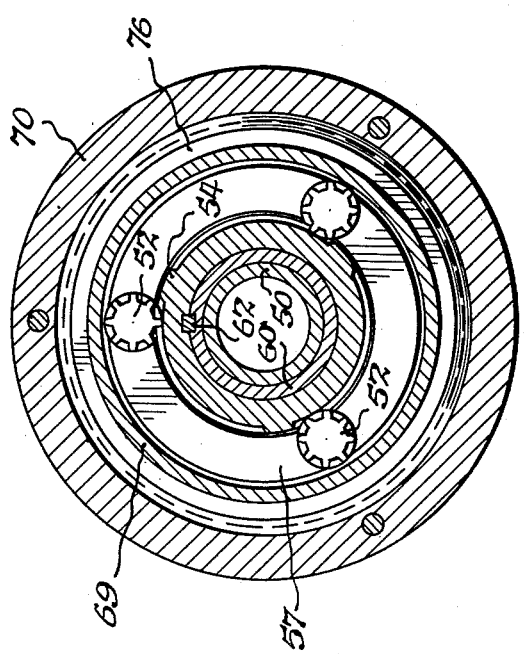

FIGS. 5 and 6 are transverse sections thereof on a reduced scale on lines 5—5 and 6—6 respectively, FIG. 4.

In FIGS. 1 to 3 I have illustrated my invention as applied to a collet actuating device operated manually. The collet may be of any usual or suitable type including spring fingers 10 having tapering external faces 11 which cooperate with an internal tapering face provided in lathe spindle 12. The collet is suitably connected with a draw tube or tubular member 14 movable back and forth lengthwise of its axis to move the collet jaws into and out of gripping relation to a work piece to be rotated by the lathe spindle. In the construction shown, the jaws of the collet are moved into gripping position when the draw tube 14 is moved to the left in FIG. 1 and released when the draw tube is moved to the right.

The two tubular members are moved relatively to each other by means of a group of screws cooperating with an annular internally threaded member or sleeve 18. In the construction shown for this purpose 16 represents the externally threaded screws or rod which engages with internal threads formed in a sleeve 18. This sleeve is secured to the draw tube or inner tubular member in any suitable manner, for example by means of cooperating, screw threaded parts 19.

The other tubular member or spindle of the lathe is provided with an abutment 22 in the form of a sleeve or collar suitably mounted on the lathe spindle and held against turning thereon, for example by means of a pin having a head 24 movable in a key way or slot formed in the spindle. Preferably three screws 16 are provided and spaced at intervals about the axis of the lathe spindle and positioned to engage the sleeve 22 when turned in one direction. This turning of the screws urges them against the abutment or collar 22 and results in moving the sleeve 18 and the draw tube to which it is secured to the left in FIG. 1, in which the parts are shown in the positions which they occupy when the collet is in work releasing position.

The screws 16 may be actuated in any suitable or desired manner. In the particular construction shown the heads of the screws 16 are in the form of helical pinions 25 formed to cooperate with a helical gear 27 having teeth extending about 45° to the axis of the gear, which is splined on the draw tube 14 by means of a key or spline 28. The gear 27 may be moved lengthwise of the draw tube in any suitable or desired manner. In the construction shown for this purpose, I have provided a bearing preferably in the form of a ball-bearing having an inner race 30 secured to the helical gear 27 and an outer race 31 which may be moved parallel to the draw tube and lathe spindle in any suitable manner. In the construction shown, by way of example in FIGS. 1–3, I have provided a hand lever 33 pivoted to one end of a link 34, the other end of which is pivoted at 35 to a fixed part of the lathe or other machine to which this improvement is applied. The hand lever is provided with a bowed or circular part which extends about the outer race 31 of the bearing and is pivoted thereto at 37. Consequently this lever may be swung in either direction to impart lengthwise movement to the gear 27 which in turn rotates the pinions 25. This results in the turning of the screws 16 to the extent necessary to actuate the collet. It will be noted that when the lever has been moved in a direction to move the collet into clamping position, the lever may be released without any possibility of having the collet become disengaged since the screws 16 cannot be turned merely by axial pressure on the same. It is therefore not necessary to hold the lever in collet closed position in order to hold the collet in gripping engagement.

When the mechanism which is shown in the release position in FIG. 1 is actuated to cause a collet to grip a work piece, the lever 33 is swung to the left which causes the screws 16 to rotate in a direction to cause the ends thereof to press against the sleeve or collar 22, thus causing the internally threaded part 18 and the draw tube connected therewith to move to the left in FIG. 1 until the draw tube has moved the collet into position to firmly grip the work. When it is desired to release the collet from engagement with the work, the lever 33 is swung to the right, causing the gear 27 to rotate the screws 16 in the opposite direction, thus releasing the internally threaded sleeve 18 and the draw tube connected therewith to move to the right in FIG. 1. Since the collet may tend to remain locked in its gripping position, it can be moved out of this position by engagement of the adjacent end of the gear 27 with the inwardly extending shoulder 38 of the internally threaded member 18.

By means of the construction described, the screws 16 can impart a considerably greater movement to the draw tube without adjustment than was heretofore possible, with the result that the collet can operate successfully with work varying to a greater extent in diameter than was heretofore possible.

The mechanism described is constructed so that it may be adjusted to cooperate with work pieces which are either larger or smaller in diameter than those for which the mechanism is set. This can readily be done by adjusting the sleeve 18 relative to the abutment collar 22 which has a notched periphery. This sleeve may be turned to adjust the initial positions of the draw tube and spindle 12 relative to each other for enabling the collet to grip work pieces of different sizes. In order to hold the sleeve 18 in adjusted position, I have provided a latch 40 which is pivoted at 41 in a recess 42 formed in the sleeve 18. This latch may enter between any of the teeth formed on the collar 22 and is yieldingly held in this position by means of a detent or holding member 43 urged by a spring against a V-shaped part 44 of the latch 40. The latch may be moved out of engagement with the toothed periphery of the collar 22 by swinging it about its pivot in a clock-wise direction, FIG. 1, and will be held in this position until the sleeve 18 has been adjusted as desired, whereupon the latch may be swung into tooth engaging position as shown in FIG. 1 and releasably held in this position by the holding member 43.

45 represents a disk or cover member which closes that end of the member 18 opposite to the end facing the abutment sleeve or flange 22, so that lubricant can be retained on gears 25, and screws 16, and dirt kept out.

In FIGS. 4-6 I have illustrated my improved mechanism modified to be operated by compressed air. In this construction 50 represents the draw tube and 51 the spindle of the lathe or other machine. In this construction externally threaded screws or rods 52 are employed which have heads forming spiral pinions meshing with a spiral gear 54. The spindle 51 has an abutment sleeve or collar 55 which is held against a nut or threaded collar 56 threaded on a part of the spindle. When the screws 52 are rotated in a direction to cause the collet to grip the work, the ends of the screws abut against the abutment sleeve or collar 55 and thus force the internally screw threaded sleeve or member 57 to move away from the abutment collar 55. This internally threaded sleeve or member 57 is mounted by means of a threaded engagement 59 on a drawbar actuating sleeve 60, having a spline connection at one end thereof with the spindle 51. The sleeve 60 when thus moved to the left in FIG. 4 engages an end collar 64 secured to the draw bar and moves the same into work gripping position. The draw bar actuating sleeve 60 is provided on its outer surface with a spline 62 which engages the gear 54 to permit sliding of the gear lengthwise of the actuating sleeve 60.

When the gear 54 is moved to the right to release the collet, the reverse operation takes place namely that the draw bar actuating sleeve 60 is released for movement to the right in FIG. 4, so that the gear 54 abuts against the threaded sleeve 57 and moves the draw bar into collet releasing position.

The movement of the gear 54 is produced by means of a bearing 68 as in the construction shown in FIGS. 1 to 3, but in this case the bearing is moved by pneumatically operated means.

In the construction shown for this purpose the bearing is moved by means of a circular piston member 69 movable parallel to the axis of the lathe spindle and arranged in an annular cylinder member 70 which is secured by means of bolts 71 or the like to the head stock 72 of the lathe or screw machine. 73 represents a cylinder head secured to one end of the cylinder. This cylinder member 70 has an annular chamber 75 formed therein and the piston member has an annular projection 76 extending into the chamber 75. Sealing rings, such as O-rings, are provided between the piston part 76 and the wall of the cylinder chamber 75 and similar rings are provided to form air tight connections between the cylinder member 70 and the piston member 69. Air or other fluid medium may be admitted by means of tubes 77 and 78 to one side or the other of the piston projection 76, the admission of air being controlled by any suitable valve member 80 controlled by means of a handle 81.

The piston member 69 has an inwardly projecting flange 85 arranged at one side of the outer race of the bearing 68 and another annular inwardly extending part 86 secured to the piston member is arranged at the other side of the outer race of the bearing 68. Contact pins 82 extend through these flanges and have heads which contact the outer bearing race. These contact pins are so spaced relatively to each other as to provide a small amount of clearance between these pins and the outer bearing race, this clearance being for example on the order of about ten thousandths of an inch. This enables the outer race of the bearing to float freely except when air pressure is actually closing or releasing the collet.

88 represents a ring which is mounted in fixed relation to the draw bar actuating sleeve 60 and which is provided with a set screw 90 having a threaded engagement with the ring 88 and having an end extending through a hole in the sleeve 60 into engagement with the draw bar 50, so that when the set screw is tightened, the draw bar and sleeve 60 are connected. When the draw bar is turned to engage its screw threads with those of the collet, the set screw 90 is released from engagement with the draw bar, so that the collar 64 and the draw bar connected therewith can be rotated. This structure is also used when it is desired to adjust the collet for cooperation with work pieces of different diameter. The set screw 90 when tightened holds the draw bar in fixed relation to the draw bar actuating sleeve 60. The flange 86 is provided with an axially extending part or guard 87 which extends over ring 88 connected with the outer end of the draw bar actuating sleeve 60.

From the foregoing, it will be obvious that when compressed air or other fluid is admitted to the cylinder at one side of the piston projection 76, the piston will move in one direction and when air from that side of the piston is discharged and air under pressure is admitted to the other side thereof, the piston will move in the opposite direction. In such case the piston moves the bearing 68 to impart motion to the gear 54.

In pneumatically operated collet actuating devices as heretofore constructed, it was necessary to maintain the fluid pressure on the actuated mechanism while the parts are in collet closing positions so that fluid pressure acted on the mechanism continuously during the time that the collet was closed. With my improved mechanism as herein described, it will be noted that air pressure is applied only for moving the piston 69 in either direction and as soon as the piston has been moved to collet closing position, fluid pressure is no longer needed since the screws 52 are not reversible merely by axial pressure acting on them. Consequently inadvertent opening of the collet by failure of air pressure which might release the work and possibly injure an operator is prevented by the construction shown.

It will be understood that various changes in the details, materials and arrangements of parts which have been herein described and illustrated in order to explain the nature of the invention, may be made by those skilled in the art, within the principle and scope of the invention as expressed in the appended claims.

I claim:

1. A collet actuating mechanism including a pair of concentrically arranged tubular members one of which is movable axially relatively to the other, an annular part secured to one of said members and having a plurality of internally threaded holes arranged about the axis of said tubular members in spaced relation from each other, an abutment member mounted on the other of said tubular parts, screws extending through said screw threaded holes and pressing against said abutment member when turned in one direction to move said tubular members relatively to each other, and means for simultaneously turning said screws, including spiral pinions on said screws, a spiral gear movable lengthwise of said tubular members and engaging said pinions for simultaneously turning said screws, and means for moving said spiral gear including a ball bearing having an inner race secured to said spiral gear and an outer race movable parallel to said tubular members.

2. A collet actuating mechanism including a pair of concentrically arranged tubular members one of which is movable relatively to the other, an annular part extending about one of said tubular members and secured thereto and having internally screw threaded apertures arranged about its axis, an abutment member connected with the other of said tubular members, said threaded apertures being arranged at substantially equally spaced intervals about the axis of said part, screws having threaded engagement with said apertures and having one of their ends arranged to press against said abutment member, spiral pinions on the other ends of said screws, a spiral gear of cylindrical form arranged concentrically with said movable tubular members and engaging said pinions, and means for moving said spiral gear to turn said pinions and said screws for moving said screws into and out of pressing engagement with said abutment member, said spiral gear having an end portion formed to engage said annular member to move said movable tubular member in a direction opposite to that in which it is moved when said screws engage said abutment member.

3. A collet actuating mechanism including a pair of concentrically arranged tubular members one of which is movable relatively to the other, an annular part extending about one of said tubular members and secured thereto and having internally screw threaded apertures arranged about its axis, an abutment member connected with the other of said tubular members, said threaded holes being arranged at substantially equally spaced intervals about the axis of said part, screws having threaded engagement with said apertures and having one of their ends arranged to press against said abutment member, spiral pinions on the other ends of said screws, a spiral gear of cylindrical form arranged concentrically with said movable tubular members and engaging said pinions, means for moving said spiral gear to turn said pinions and said screws for moving said screws into and out of pressing engagement with said abutment member, a bearing member having inner and outer races, the inner race being connected with said spiral gear and the outer race being movable lengthwise of said tubular members to impart similar movement to said spiral gear, and pressure actuated mechanism connected with said outer race to move said spiral gear lengthwise of said tubular members in either direction.

4. A collet actuating mechanism including a pair of concentrically arranged tubular members one of which is movable relatively to the other, an annular part extending about one of said tubular members and secured thereto and having internally screw threaded apertures arranged about its axis, an abutment member connected with the other of said tubular members, said threaded holes being arranged at substantially equally spaced intervals about the axis of said part, screws having threaded engagement with said apertures and having one of their ends arranged to press against said abutment member, spiral pinions on the other ends of said screws, a spiral gear of cylindrical form arranged concentrically with said movable tubular members and engaging said pinions, means for moving said spiral gear to turn said pinions and said screws for moving said screws into and out of pressing engagement with said abutment member, a bearing member having inner and outer races, the inner race being connected with said spiral gear and the outer race being movable lengthwise of said tubular members to impart similar movement to said spiral gear, an annular piston extending about the axis of said tubular members, an annular cylinder cooperating with said piston, means for supplying fluid under pressure to said cylinder at either side of said piston, and a connection between said piston and the outer race of said bearing for moving said bearing and the spiral gear connected therewith in either direction.

5. A collet actuating mechanism including a pair of concentrically arranged tubular members one of which is movable axially relatively to the other, means connected with both of said members for moving said members lengthwise relatively to each other for opening and closing a collet, and adjusting means for limiting the movement of said tubular members relatively to each other in one direction, said adjusting means including a locking part releasably locking the inner of said tubular members to said moving means, said locking part when released from said inner tubular member permitting said inner tubular member to be turned about its axis relatively to said moving means and said outer tubular member.

6. A collet actuating mechanism including a pair of concentrically arranged tubular members one of which is movable axially relatively to the other, means connected with both of said members for moving said members lengthwise relatively to each other for opening and closing a collet, and adjusting means for limiting the movement of said tubular members relatively to each other in one direction, said adjusting means including a set screw having a threaded engagement with said moving means and extending through said moving means into position to engage said inner tubular member, said set screw when released permitting said inner tubular member to be turned on its axis relatively to said moving means and said other tubular member for adjusting a collet.

7. A collet actuating mechanism including a pair of concentrically arranged tubular members one of which is movable relatively to the other, an annular part extending about one of said tubular members and secured thereto and having internally screw threaded apertures arranged about its axis, an abutment member connected with the other of said tubular members, said threaded apertures being arranged at substantially equally spaced intervals about the axis of said part, screws having threaded engagement with said apertures and having one of their ends arranged to press against said abutment member, spiral pinions on the other ends of said screws, a spiral gear of cylindrical form arranged concentrically with said movable tubular members and engaging said pinions, means for moving said spiral gear to turn said pinions and said screws for moving said screws into and out of pressing engagement with said abutment member, and a bearing member having inner and outer races, said inner race being connected with said spiral gear and said outer race being movable lengthwise of said tubular members to impart similar movement to said spiral gear.

8. A collet actuating mechanism including a pair of concentrically arranged tubular members one of which is movable relatively to the other, an annular part extending about one of said tubular members and secured thereto and having internally screw threaded apertures arranged about its axis, an abutment member connected with the other of said tubular members, said threaded apertures being arranged at substantially equally spaced intervals about the axis of said part, screws having threaded engagement with said apertures and having one of their ends arranged to press against said abutment member, spiral pinions on the other ends of said screws, a spiral gear of cylindrical form arranged concentrically with said movable tubular members and engaging said pinions, means for moving said spiral gear to turn said pinions and said screws for moving said screws into and out of pressing engagement with said abutment member, and a bearing member having inner and outer races, said inner race being connected with said spiral gear and including a lever pivotally connected with said outer race for moving the same in either direction lengthwise of said tubular member for moving said spiral gear.

References Cited in the file of this patent

UNITED STATES PATENTS

| 814,647 | Hanson | Mar. 6, 1906 |
|---|---|---|
| 905,518 | Hanson | Dec. 1, 1908 |
| 2,311,258 | Sjogren | Feb. 16, 1943 |
| 2,359,507 | Bell | Oct. 3, 1944 |
| 2,528,146 | Hubert | Oct. 31, 1950 |